Figure 1:
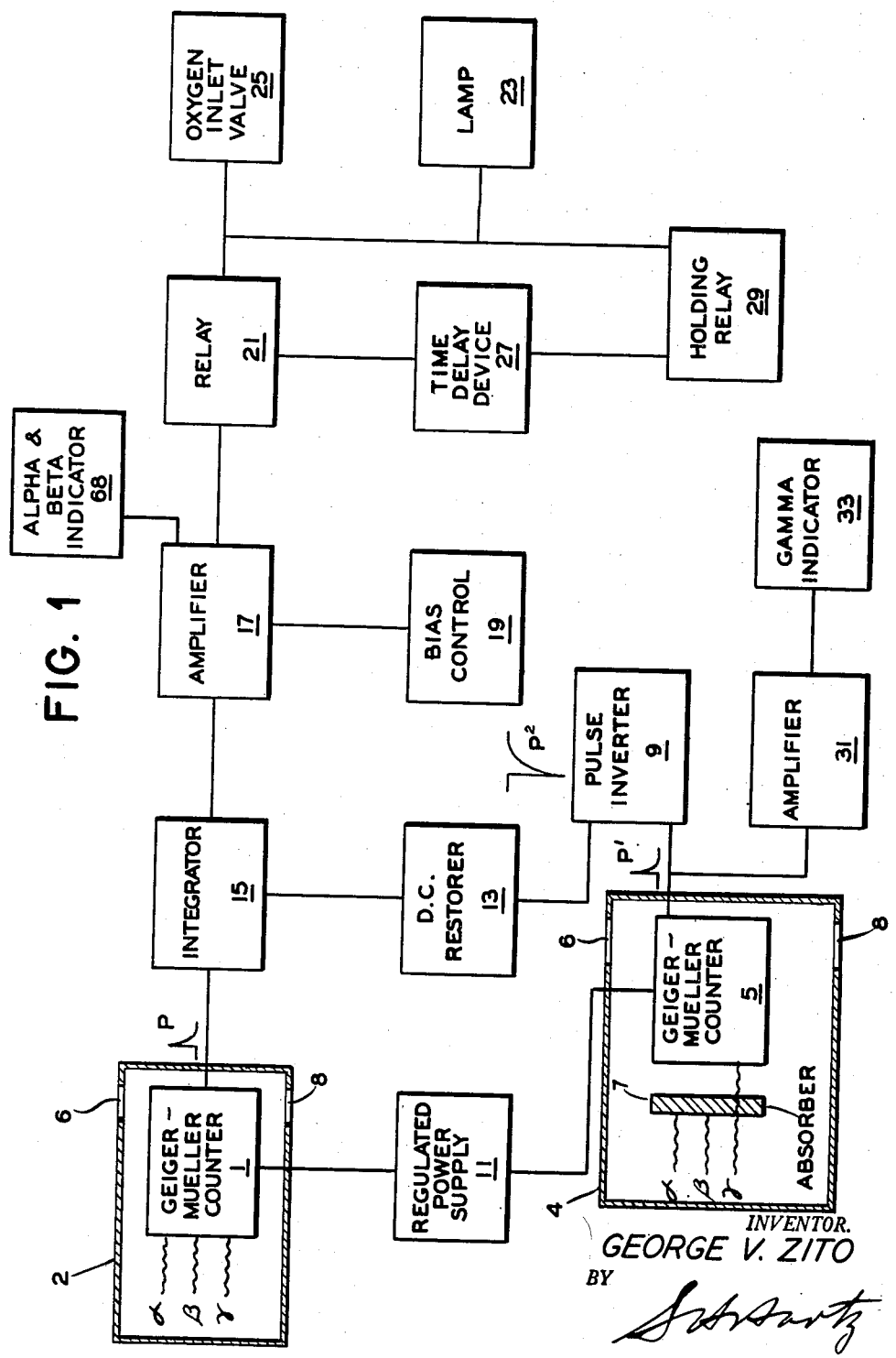

April 15, 1958

G. V. ZITO 2,831,121

APPARATUS FOR DETECTING ALPHA AND BETA RAYS

Filed Sept. 27, 1952

2 Sheets-Sheet 1

INVENTOR.
GEORGE V. ZITO
BY
ATTORNEY

April 15, 1958  G. V. ZITO  2,831,121
APPARATUS FOR DETECTING ALPHA AND BETA RAYS
Filed Sept. 27, 1952  2 Sheets-Sheet 2

INVENTOR.
GEORGE V. ZITO
BY
ATTORNEY

United States Patent Office 2,831,121
Patented Apr. 15, 1958

2,831,121

APPARATUS FOR DETECTING ALPHA AND BETA RAYS

George V. Zito, Northvale, N. J., assignor to Bendix Aviation Corporation, Teterboro, N. J., a corporation of Delaware Application September 27, 1952, Serial No. 311,831

19 Claims. (Cl. 250—83.6)

The invention relates to the dection of alpha and beta rays in the atmosphere and, more particularly to their detection in the presence of a strong gamma and cosmic ray field.

It is a well known fact that atomic bomb explosions produce alpha, beta and gamma rays and that the harmful radiobiological effects of the rays on man are substantially proportional to the density of ionization along the ray path. Alpha and beta particles of the same energy produce substantially high specific ionization, whereas gamma rays of the same energy produce relatively low specific ionization. Cosmic rays, normally present in the atmosphere, also produce relatively low specific ionization.

Atomic bomb explosions produce dust and gas clouds which emit alpha, beta and gamma rays; and the alpha and beta rays in sufficient concentration in the atmosphere when breathed by man will severely injure or kill him, whereas the gamma rays when breathed in the same concentration or even in stronger concentrations will have little or no effect upon him.

One object of the present invention is to detect the presence of harmful concentrations of alpha and beta rays in a gamma ray and cosmic ray field.

Another object is to operate an alarm when the alpha and beta ray concentration is above a predetermined level.

Another object is to detect the presence of harmful concentrations of dust and gases emitting alpha, beta and gamma radiation.

A more specific object is to avoid breathing the contaminated air by equipping people in the bombed area with oxygen regulators and operating the regulators automatically when the alpha and beta ray concentration of the air being breathed is above a predetermined level.

Another object is to indicate the concentration of alpha and beta radiation in a gamma ray field.

Another object is to indicate the concentration of other radioactive rays other than the alpha and beta rays, such as gamma rays and cosmic rays.

Another object is to provide an electrical circuit for determining the average rate of occurrence of random pulses from two separate sources and in which coincident pulses from the two sources cancel one another and the remaining pulses provide the average rate of occurrence.

The invention may be used on the ground or in aircraft or other vehicles and avoids actuation of the alarm or the oxygen system in response to strong gamma ray or cosmic ray fields in the absence of alpha and beta rays of predetermined concentration.

The invention contemplates apparatus having control means responsive to radioactive radiation in the air to be breathed and an oxygen regulator controlled by the control means and providing for oxygen flow when the radioactive radiation is above a predetermined concentration. The control means responds to the alpha and beta ray concentration irrespective of the presence of gamma rays (including cosmic rays). A pair of Geiger-Mueller counters provide signals in response to the radioactive radiation, one of the counters being responsive to alpha, beta and gamma rays (including cosmic rays) and the other of the counters being responsive to gamma rays (including cosmic rays). The control circuit responds to the difference in the signals from the counters.

If the apparatus is used to detect the concentration of airborne alpha and beta radiation from dust and gas clouds that are being breathed, then the counters should be shielded from the alpha and beta rays other than those which are airborne. This may be accomplished by providing a casing for the counters of sufficient absorption cross section to absorb alpha and beta radiation, and having apertures therein for receiving and discharging the air being breathed. When the apparatus is used in aircraft, then the aircraft acts as the shield and the counters preferably are positioned in the air intakes of the craft to sample the air being breathed by the occupants of the craft.

The foregoing and other objects and advantages of the invention will appear more fully hereinafter from a consideration of the detailed description which follows, taken together with the accompanying drawings wherein one embodiment of the invention is illustrated. It is to be expressly understood, however, that the drawings are for the purposes of illustration and description only, and are not to be construed as defining the limits of the invention.

Figure 2:
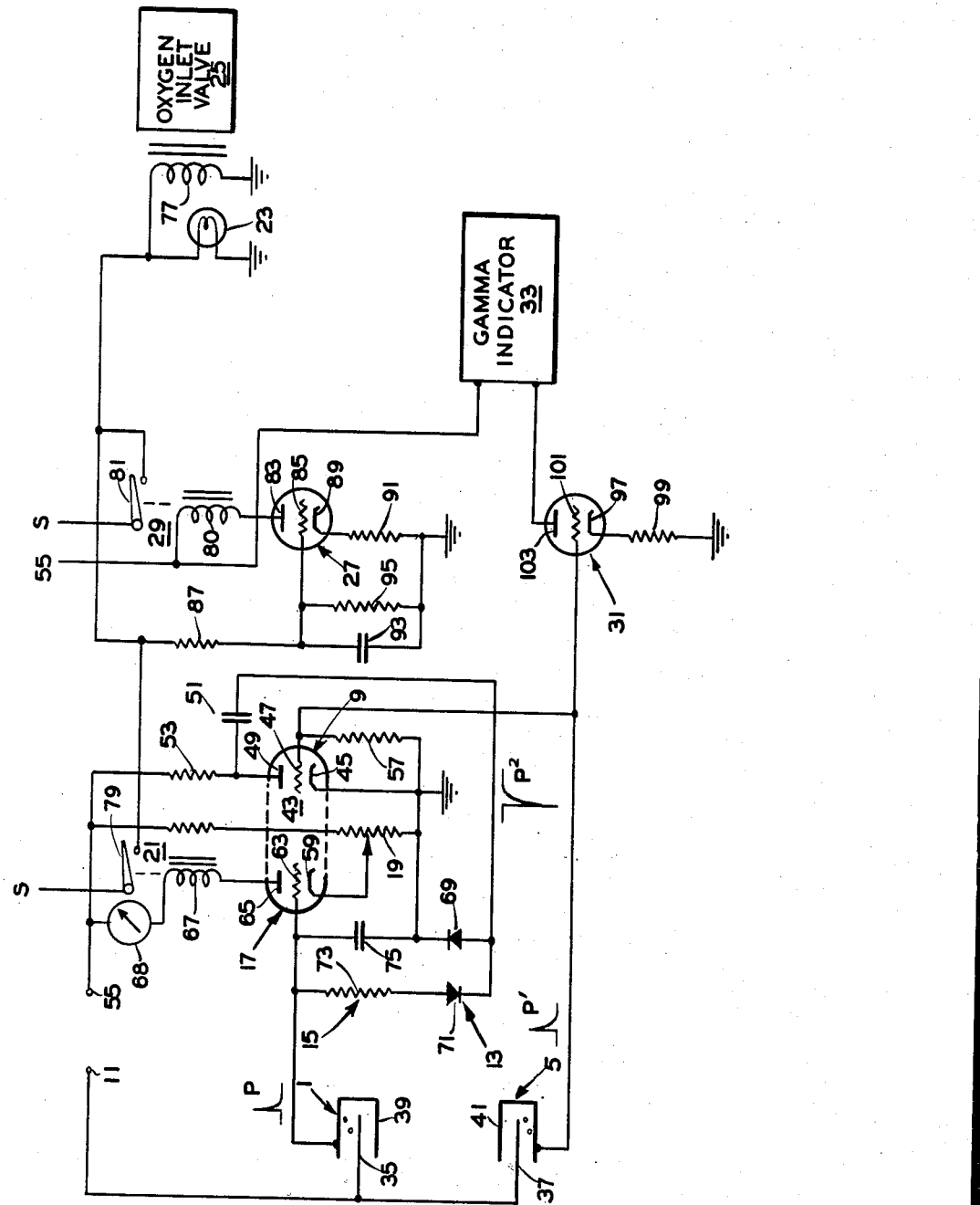

In the drawings,

Figure 1 is a block diagram of a control system constructed according to the invention and responsive to alpha and beta rays in a gamma ray and cosmic ray field and arranged to operate an alarm and control the flow of oxygen when the alpha and beta ray concentration attains a predetermined value, and Figure 2 is a schematic wiring diagram of the system shown in Figure 1.

Referring now to the drawings for a more detailed description of the novel control system of the invention, the control system is shown in Figure 1 as comprising a Geiger-Mueller counter 1 sensitive to alpha, beta and gamma radiation (including cosmic rays) and producing positive pulses P of fixed amplitude in response thereto.

A second Geiger-Mueller counter 5 closely associated with Geiger-Mueller counter 1 and of identical geometry and sensitivity has its alpha and beta window covered with a stainless steel absorber 7 and is responsive only to gamma radiation (including cosmic rays). Counter 5 produces positive pulses P' in responsive to gamma rays (including cosmic rays) and the pulses are inverted and amplified by a pulse inverter 9, as shown at P². Counters 1 and 5 preferably are energized by a regulated power supply 11 connected thereto.

A D. C. restorer 13 is connected to a pulse inverter 9 and receives pulses P² therefrom. An integrator network 15 receives the pulses P from Geiger-Mueller counter 1 and the pulses P² from D. C. restorer 13 and produces a D. C. potential having an amplitude corresponding to the difference in the number of pulses from counters 1 and 5. Counter 1 produces a positive pulse for each alpha, beta and gamma ray (including cosmic rays) and counter 5 produces a positive pulse for each gamma ray (including cosmic rays). The positive pulses from counter 5 are inverted to negative pulses and the resulting D. C. potential at the output of integrator 15 is the difference in the number of pulses. Counters 1 and 5 each produce a pulse for each gamma particle (including cosmic rays) and these pulses cancel one another so that the resulting D. C. potential at the output of integrator 15 corresponds to the number of pulses due to alpha and beta particles.

An amplifier 17 is connected to integrator 15 and is controlled by the D. C. potential therefrom and, when the potential is above a predetermined value as determined by an adjustable bias control 19, the amplifier energizes a relay 21 connected in the amplifier plate circuit. This energizes an indicating lamp 23 and actuates an electrically controlled valve 25 of a pressure demand oxygen regulator to provide for oxygen flow therethrough. An indicator 68 may be connected to amplifier 17 to indicate the alpha-beta radiation.

Upon operation of relay 21 a control voltage is applied to a time delay device 27 causing current flow therethrough to energize a holding relay 29 having its contacts connected in parallel with the contacts of relay 21. When the D. C. potential across integrator 15 drops below a predetermined value, as determined by the bias control voltage, relay 21 is deenergized, but relay 29 remains energized for a short period and provides for energization of lamp 23 and valve 25 until current flow in the circuit of time delay device 27 decreases and deenergizes relay 29. This takes approximately 30 seconds, but if during this time relay 21 is energized again because of increased current flow in the plate circuit of amplifier 17, then time delay device 27 remains conductive and lamp 23 and oxygen regulator valve 25 continue to be energized. However, if relay 21 is deenergized before relay 29 is again energized, then valve 25 closes and lamp 23 is deenergized. In other words, relay 21 must remain in a safe position for at least 30 seconds before a safe signal is transmitted by lamp 23 and regulator valve 25 is closed. This insures purging of the contaminated air and prevents the issuing of a false safe signal and also precludes oscillation of oxygen regulator valve 25 when passing through areas of varying radiation close to the tolerance level.

In some instances, it may be desirable to provide indications of gamma ray (including cosmic ray) radiation and an amplifier 31 may be connected to counter 5 to operate an indicator 33 or other suitable means for indicating gamma rays concentration.

The circuit of Figure 2 shows in more detail the circuit of Figure 1. Geiger-Mueller counters 1, 5 are shown as having anodes 35, 37 and cathodes 39, 41, respectively. Anodes 35, 37 are connected in parallel to regulated power supply 11.

Pulse inverter 9 comprises one half of a dual triode 43 having a cathode 45 connected to ground, a grid 47 connected to cathode 41 of counter 5, and an anode 49 connected through a blocking condenser 51 to D. C. restorer 13 and through a load resistor 53 to a plate potential source 55. A grid biasing resistor 57 is connected between grid 47 and cathode 45.

Amplifier 17 comprises the other half of dual triode 43 and includes a cathode 59 connected through adjustable biasing control resistor 19 to ground, a grid 63 connected to integrator 15 and to cathode 39 of counter 1, and an anode 65 connected through energizing winding 67 of reelay 21 and an alpha-beta indicator 68 to plate potential source 55.

D. C. restorer 13 comprises a pair of diodes 69, 71, diode 69 being connected between coupling condenser 51 and ground and diode 71 being connected through a resistor 73 of integrator 15 to grid 63 of amplifier 17. Integrator 15 also includes a condenser 75 connected between grid 63 of amplifier 17 and ground in parallel with series connected resistor 73 and diodes 69, 71.

Lamp 23 and a solenoid 77 for operating oxygen inlet valve 25 are connected through contacts 79 of relay 21 to power source S.

Time delay device 27 comprises a triode having an anode 83 connected through a relay winding 80 of time delay relay 29 to plate potential source 55, a grid 85 connected through a resistor 87 to contacts 79 of relay 21, and a cathode 89 connected through a cathode resistor 91 to ground. A biasing condenser 93 and a resistor 95 are connected in parallel between grid 85 and ground.

Relay 29 has contacts 81 connected in parallel with contacts 79 of relay 21 to power source S, lamp 23 and solenoid 77 of valve 25. As explained above, contacts 81 of relay 29 connect lamp 23 and valve solenoid 77 to power source S for a short period after contacts 79 of relay 21 open.

Auxiliary amplifier 31 comprises a triode having a cathode 97 connected through a cathode resistor 99 to ground, a grid 101 connected to cathode 41 of counter 5, and a plate 103 connected to the input of indicator 33 for indicating the concentration of the gamma ray field.

The arrangement described operates as follows:

When radioactive radiation impinges upon signal counters 1 and 5, the counters originate positive pulses of substantially uniform amplitude and duration. Counter 1 provides a pulse P for each alpha, beta and gamma ray (including cosmic rays) impinging on its sensitive volume, and counter 5 provides a pulse P' for each gamma ray (including cosmic rays) impinging on its sensitive volume. As counter 1 discharges, electrons flow from ground through diodes 69, 71, in the low resistance direction, and resistor 73 to counter cathode 39 and counter anode 35 and through the regulated power supply 11 back to ground. The potential across resistor 73 and diodes 69, 71 in the low resistance direction provides a potential across condenser 75 and since condenser 75 can not charge instantaneously, the potential on grid 63 rises exponentially in the positive direction. When the pulse has decayed, a net charge is deposited on condenser 75 and the electrons on the condenser plate at the grid side of the condenser tend to leak off through resistor 73 and diodes 69, 71 to equalize the charge on the other condenser plate, whereupon the potential on grid 63 decays exponentially. If counter 1 provides a second pulse before condenser 75 has fully discharged, the second pulse adds an additional charge on the condenser and the instantaneous voltage on grid 63 increases. The time constant of the integrating network 15 is greater than the average interval between pulses so that the average voltage developed across the network is proportional to the rate of occurrence of the pulses.

A positive pulse P' originating at counter 5 in response to gamma radiation (including cosmic rays) provides electron flow from ground through resistor 57 to counter cathode 41 and counter anode 37 and through power supply 11 back to ground. Grid 47 of pulse inverter 9 goes positive with current flow through resistor 57 and increases plate current flow through the tube. The potential drop across resistor 53 increases and lowers the plate potential so that the resulting amplified pulse P² in the plate circuit of pulse inverter 9 is negative with respect to ground. The negative pulse causes condenser 51 to lose some of its charge accumulated from plate potential source 55 and provides for electron current flow from the condenser through diode 69 in the high resistance direction and through diode 71 in the low resistance direction and through resistor 73. The resistance of diode 69 in the high resistance direction is greater than the sum of the resistance of resistor 73 and diode 71 in the low resistance direction and hence substantially the entire negative pulse appearing across diode 69 is impressed across condenser 75. The net voltage developed across condenser 75 is equal to the difference in the voltage produced by pulses from counters 1 and 5 and corresponds to alpha and beta radiation only. Additional gain of the gamma channel is required over the alpha, beta, gamma channel to compensate for the less efficient method of charging condenser 75.

When the net voltage developed across condenser 75 reduces the grid bias substantially to zero volts, plate current in amplifier 17 closes contacts 79 of relay 21 to energize lamp 23 and operate oxygen inlet valve 25 to provide for oxygen flow from the regulator. When relay contacts 79 of relay 21 close, the increased potential across resistor 87 connected to grid 85 of time delay tube 27 causes condenser 93 to charge sufficiently to overcome the bias provided by cathode resistor 91 to increase the plate current in the time delay tube sufficiently to operate relay 29 providing a parallel connection through contacts 81 from source S to lamp 23 and valve solenoid 77.

When the net voltage developed across condenser 75 falls below zero volts, the plate current in amplifier 17 decreases so that relay 21 is deenergized and its contacts 79 open. Condenser 93 in the time delay circuit discharges slowly so that after a short period (approximately 30 seconds) contacts 81 of relay 29 open and deenergize lamp 23 and valve solenoid 77. If contacts 79 of relay 21 close before condenser 93 is discharged sufficiently to provide for opening contacts 81 of relay 29, then there will be no interruption of energization of lamp 23 and valve solenoid 77 and condenser 93 will increase its charge and start a new period.

When the device is used for detecting airborne particles emitting alpha and beta radiation which would be breathed, counters 1 and 5 should be enclosed in casings 2 and 4 respectively to prevent their being affected by alpha and beta radiation. Each casing has openings 6, 8 for receiving and discharging air to be sampled.

With the apparatus described, persons in the vicinity after an atomic bomb explosion are automatically supplied with oxygen when the airborne concentration of gases containing harmful alpha and beta rays reaches a predetermined level. An alarm operates simultaneously with release of oxygen so that the operator will know of the drain on his oxygen supply and whether or not the airborne alpha and beta ray concentration is harmful. The apparatus avoids false signals in response to strong gamma radiation (including cosmic rays) and distinguishes between alpha and beta radiation, and gamma radiation in a strong gamma ray field. The invention may be used on the ground or in aircraft or other vehicles.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a device of the class described, a pair of counters adapted to provide pulses in response to radioactive radiation, one of said counters being responsive to alpha, beta and gamma rays and the other of said counters being responsive to gamma rays, a pulse inverter connected to one of said counters for inverting the pulses therefrom, means connected to said other counter and to said converter for providing a D. C. potential corresponding to the pulse difference from said counters, and means operatively associated with said means and operated thereby when the alpha and beta radiation is above a predetermined level.

2. In a device of the class described, a pair of counters adapted to provide positive pulses in response to radioactive radiation, one of said counters being responsive to alpha, beta and gamma rays and the other of said counters being responsive to gamma rays, a pulse inverter connected to said gamma responsive counter for inverting the positive pulses from said gamma counter to negative pulses, a D. C. restorer connected to said pulse inverter and adapted to provide a D. C. potential corresponding to the pulses from said pulse inverter, an integrator connected to said first counter and to said D. C. restorer and adapted to provide a potential corresponding to the difference in the pulses from said counters, a control circuit connected to said integrator and controlled by the potential therefrom, and controlled means connected to said control circuit and controlled by its output and operating when the alpha and beta radiation is above a predetermined level.

3. In a device of the class described, a pair of counters adapted to provide pulses in response to radioactive radiation, one of said counters being responsive to alpha, beta and gamma rays and the other of said counters being responsive to gamma rays, a pulse inverter connected to said gamma responsive counter for inverting the pulses therefrom, a D. C. restorer connected to said pulse inverter and adapted to provide a D. C. potential corresponding to the pulses from said pulse inverter, an integrator connected to said first counter and to said D. C. restorer and adapted to provide a potential corresponding to the difference in the pulses from said counters, an amplifier connected to said integrator and controlled by the potential therefrom, a relay connected to said amplifier and controlled by its output and operating when the alpha and beta radiation is above a predetermined level, an oxygen regulator operably associated with said relay and controlled thereby to provide for oxygen flow when the alpha and beta radiation is above the predetermined level, and a time delay circuit controlled by said relay and continuing oxygen flow from said oxygen regulator for a short period after the alpha and beta ray concentration falls below the predetermined level.

4. An oxygen inhalation supply control system, comprising an oxygen inhalation supply independent of ambient air and including an oxygen flow regulator, and control means responsive to radioactive radiation for controlling said regulator to provide oxygen flow only when the concentration of said radiation is above a predetermined level.

5. An oxygen inhalation supply control system, comprising an oxygen inhalation supply independent of ambient air and including an oxygen flow regulator, and control means responsive only to alpha and beta rays and unaffected by gamma rays for controlling said regulator to provide oxygen flow only when the concentration of said alpha and beta rays is above a predetermined level.

6. An oxygen inhalation supply control system, comprising an oxygen inhalation supply independent of ambient air and including an oxygen flow regulator, and control means responsive to the concentration of radioactive radiation emanating only from sources in suspension in air to be inhaled, for controlling said regulator to provide oxygen flow only when the concentration of said radiation is above a predetermined level.

7. An oxygen inhalation supply control system, comprising an oxygen inhalation supply independent of ambient air and including an oxygen flow regulator, an enclosure having walls provided with an opening for the circulation of air in the enclosure from the ambient air, shielding mean including walls of said enclosure for preventing substantial entrance into said enclosure of radioactive radiation from a source external to the enclosure, and control means including a sensing device within the enclosure responsive to radioactive radiation from particles suspended in the air within the enclosure for controlling said regulator to provide oxygen flow only when the concentration of said radiation from particles in the enclosure is above a predetermined level.

8. A radioactive radiation responsive system, comprising means including a first counter responsive to alpha, beta and gamma rays for producing first signals corresponding to the concentration of said rays, means including a second counter responsive only to gamma rays for producing second signals corresponding to the concentration of said gamma rays, means for producing resultant signals corresponding to the difference between said first and second signals and equivalent to the intensity of said alpha and beta rays alone, and control means actuated by said resultant signals when the concentration of said alpha and beta rays is above a predetermined level.

9. A radioactive radiation responsive system, comprising means including a first counter responsive to alpha, beta and gamma rays for producing first signals corresponding to the concentration of said rays, means including a second counter responsive only to gamma rays for producing second signals corresponding to the concentration of said gamma rays, means for producing resultant signals corresponding to the difference between said first and second signals and therefore corresponding to the concentration of said alpha and beta rays alone, and indicating means actuated by said resultant signals for indicating the alpha and beta ray concentration.

10. An oxygen inhalation supply control system, comprising means including a first counter responsive to alpha, beta and gamma rays for producing first signals corresponding to the concentration of said rays, means including a second counter responsive only to gamma rays for producing second signals corresponding to the concentration of said gamma rays, means for producing resultant signals corresponding to the difference between said first and second signals and to the concentration of said alpha and beta rays alone, an oxygen inhalation supply independent of the ambient air and including an oxygen flow regulator, and control means responsive to said resultant signals for controlling said regulator to provide oxygen flow only when the alpha and beta ray concentration is above a predetermined level.

11. A radioactive radiation responsive system, comprising means including a first counter responsive to alpha, beta and gamma rays for producing first signals corresponding to the concentration of said rays, means including a second counter responsive only to gamma rays for producing second signals corresponding to the concentration of said gamma rays, means for producing resultant signals corresponding to the difference between said first and second signals and to the concentration of said alpha and beta rays alone, control means actuated by said resultant signals when the concentration of said alpha and beta rays is above a predetermined level, and means for adjusting the level of said alpha and beta concentration at which said control means is operative.

12. A radioactive radiation responsive system, comprising means including a first counter responsive to alpha, beta and gamma rays for producing first signals corresponding to the concentration of said rays, means including a second counter responsive only to gamma rays for producing second signals corresponding to the concentration of said gamma rays, said counters operating in the Geiger-Mueller region and producing pulses of substantially equal amplitude in response to radioactive radiation to which the respective counters are sensitive, a control circuit including means for receiving the pulses from both counters and responsive to the difference in the number of pulses from said counters, and means controlled by said circuit and operative only when the alpha and beta ray concentration is above a predetermined level.

13. An oxygen inhalation supply system, comprising an oxygen inhalation supply independent of the ambient air and including an oxygen flow regulator, means including a first counter responsive to alpha, beta and gamma rays for producing first signals corresponding to the concentration of said rays, means including a second counter responsive only to gamma rays for producing second signals corresponding to the concentration of said gamma rays, means for producing resultant signals corresponding to the difference between said first and second signals and to the concentration of said alpha and beta rays alone, control means actuated by said resultant signals only when the concentration of said alpha and beta rays is above a predetermined level, for controlling said regulator to provide oxygen flow, and time delay means for actuating said regulator to continue said oxygen flow for a predetermined interval after said alpha and beta ray concentration falls below said level.

14. A radioactive radiation responsive system, comprising means including a first counter responsive to alpha, beta and gamma rays for producing first signals corresponding to the concentration of said rays, means including a second counter responsive only to gamma rays for producing second signals corresponding to the concentration of said gamma rays, means for producing resulting signals corresponding to the difference between said first and second signals and to the concentration of said alpha and beta rays alone, control means actuated by said resultant signals only when the concentration of said alpha and beta rays is above a predetermined level, and means connected to said second counter and responsive to said second signals.

15. A radioactive radiation responsive system, comprising means including a first counter responsive to alpha, beta and gamma rays for producing first signals corresponding to the concentration of said rays, means including a second counter responsive only to gamma rays for producing second signals corresponding to the concentration of said gamma rays, means for producing retsultant signals corresponding to the difference between said first and second signals and to the concentration of said alpha and beta rays alone, control means actuated by said resultant signals only when the concentration of said alpha and beta rays is above a predetermined level, and indicating means responsive to said second signals for indicating the intensity of said gamma rays.

16. A circuit for converting a series of electrical pulses into a D. C. potential and for cancelling coincident pulses from several sources comprising a pair of rectifiers and a resistor in parallel with a condenser, means for introducing the pulses from one of the sources into the circuit at a point between said rectifiers and for introducing the pulses from another source into the circuit between the resistor and condenser to charge the condenser in proportion to the pulse difference.

17. An electric circuit for determining the average rate of occurrence of a selected group of random radiation pulses from two separate radio-active sources, comprising means for cancelling coincident pulses from the two sources and providing a signal from the remaining selected group of pulses corresponding to their average rate of occurrence, comprising a circuit including two rectifiers connected to an integrator which includes a resistor and a condenser, said rectifiers and resistor in series being connected in parallel with said condenser, and means for applying the pulses from one source to the circuit between said rectifiers and the pulses from the other source between said resistor and said condenser.

18. An electric circuit for determining the average rate of occurrence of a selected group of random radiation pulses from two separate sources, comprising means for cancelling coincident pulses from the two sources and providing a signal from the remaining selected group of pulses corresponding to their average rate of occurrence, comprising a circuit including two rectifiers connected to an integrator which includes a resistor and a condenser, said rectifiers and resistor in series being connected in parallel with said condenser, and means for applying the pulses from one source to the circuit between said rectifiers and the pulses from the other source between said resistor and said condenser, and thereby charging said condenser in accordance with the difference in the number of pulses from the two sources.

19. An electric circuit for determining the average rate of occurrence of a selected group of random radiation pulses from two separate sources, comprising means for cancelling coincident pulses from the two sources and providing a signal from the remaining selected group pulses corresponding to their average rate of occurrence, comprising a circuit including two rectifiers connected to an integrator which includes a resistor and a condenser, said rectifiers and resistor in series being connected in parallel with said condenser, and means for applying the pulses from one source to the circuit between said rectifiers and the pulses from the other source between said resistor and said condenser, said rectifiers being poled to provide a high resistance path in one direction and a low resistance path in the other direction to pulses applied between the rectifiers.

References Cited in the file of this patent

UNITED STATES PATENTS

| | | |
|---|---|---|
| 1,908,336 | Fleming | May 9, 1933 |
| 2,456,233 | Wolf | Dec. 14, 1948 |
| 2,497,823 | Molloy | Feb. 14, 1950 |
| 2,517,404 | Morton | Aug. 1, 1950 |
| 2,534,352 | Herzog | Dec. 19, 1950 |
| 2,563,333 | Herzog | Aug. 7, 1951 |
| 2,584,138 | Lichtman | Feb. 5, 1952 |
| 2,638,273 | Jensen et al. | May 12, 1953 |
| 2,682,001 | Duffy | June 22, 1954 |